July 13, 1937. N. PEARLSTEIN 2,087,114
NUT LOCK
Filed Jan. 19, 1935
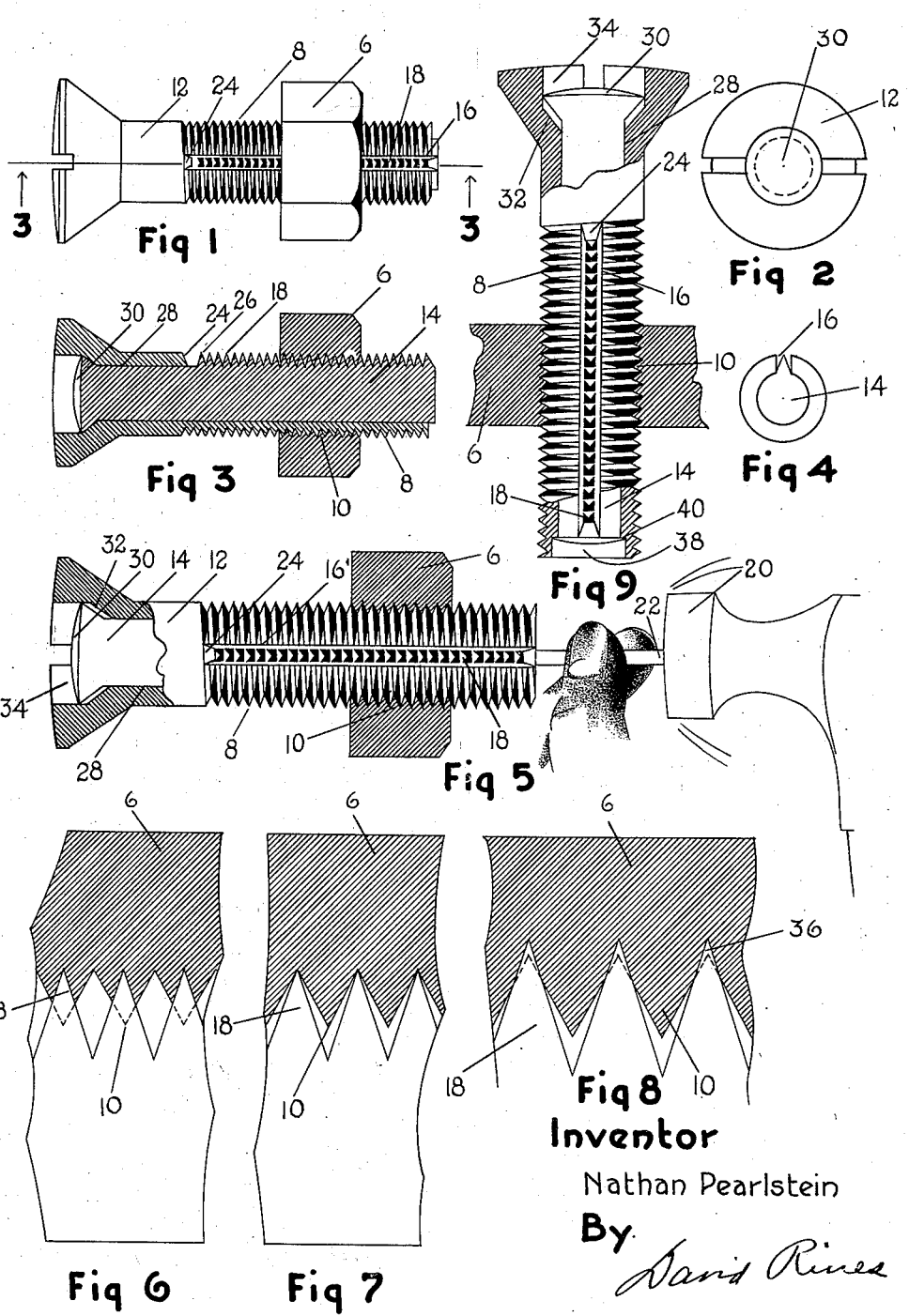
Inventor
Nathan Pearlstein
By David Rines
Attorney Patented July 13, 1937

2,087,114

UNITED STATES PATENT OFFICE 2,087,114

NUT LOCK

Nathan Pearlstein, Boston, Mass.

Application January 19, 1935, Serial No. 2,472

3 Claims. (Cl. 151—23)

The present invention relates to nut locks, and more particularly to devices for preventing the loosening of screw threaded members. Though adapted for use in many applications, the invention has especial value for small screw-threaded members, such as are used for ophthalmic mountings, the parts of which have a tendency to separate, because the threaded members do not hold tight.

An object of the invention is to provide a new and improved nut lock of the above-described character in which means is provided for plowing into the screw threads to prevent loosening of the screw-threaded member by turning. The plowing action may, in the case of ophthalmic mountings and similar members, be produced by a very slight blow upon a slidably mounted, screw-threaded key, non-rotatably mounted upon one screw-threaded member, to force its threads into the screw-threaded walls of the cooperating screw-threaded member.

Another object is to hold in threaded position very small screw-threaded members, such as are employed in ophthalmic mountings.

Other and further objects will be explained in connection with the accompanying drawing, in which Fig. 1 is an elevation of a screw embodying the present invention, a nut being shown mounted thereon; Fig. 2 is an end view, as seen from the left of Fig. 1; Fig. 3 is a longitudinal section taken upon the line 3—3 of Fig. 1, looking in the direction of the arrows; Fig. 4 is an end view, as seen from the right of Fig. 1; Fig. 5 is an enlarged elevation, parts being shown broken away and in section, illustrating the operation of locking the screw with respect to the nut; Fig. 6 is a still further enlarged, fragmentary section, corresponding to the section of Fig. 3, showing the screw locked upon the nut; Fig. 7 is a similar section showing the screw before it is locked to the nut; Fig. 8 is a section corresponding to Fig. 7 of a modification; and Fig. 9 is a view similar to Fig. 5 of a further modification.

The external threads of a metal, cylindrical screw 12 are shown cooperatively engaging internal threads 10 provided in a correspondingly cylindrical opening of a nut 6, which may typify any internally threaded member, such as an end piece of an ophthalmic mounting. The screw 12 may be in the form of a bolt, and the terms "screw" and "bolt" will hereinafter be interchangeably used in the specification and the claims in this generic sense. The screws usually employed in ophthalmic mountings are quite minute, with very few threads; and of these few threads, but a very small number are actually used for threading in order to hold the ophthalmic-mounting parts together. The number of threads 8 on the screw 12 and the number of these threads engaging the threads 10 are illustrated as greatly in excess of the number that are found in ordinary ophthalmic-mounting screws, because it is desired not to limit the present invention to any particular use. The threads of ophthalmic-mounting members, furthermore, are so designed as to enable them to become readily and quickly intermeshed by unskilled assemblers, which involves a considerable amount of looseness in their interfitting with one another. As a result of this construction, the screws 12 have a tendency to become separated from the members 6 into which they are threaded.

According to the present invention, such separation is prevented by plowing into the threads of one of the members 6, or 12, a member carried upon the other member. Specifically, a key 14, slidably but non-rotatably mounted in a slot 16 extending longitudinally of the shank of the screw 12, has a number of projections 18 that may be alined with the threads 8 in one position of the slidable adjustment of the key 14 and that may themselves act as threads along with the threads 8 with which they are alined, to permit threading the screw 12 and the key 14 as a unit into the nut 6. After the members 12 and 6 have thus become threaded upon each other, a slight blow is imparted to the key 14, as by means of a hammer 20 acting upon a pin 22, to cause the projections 18 to become plowed by the resulting sliding movement of the key 14 into the internally screw-threaded wall of the nut 6. All possibility of further relative turning movement of the screw 12 with respect to the nut 6 upon which it is threadably mounted is thus eliminated. To permit this plowing action, the key 14 is made of harder metal than the metal of the nut 6, and the projections 18 are preferably pointed or sharp, as shown.

The initial position of the threads 8 and the projections 18, corresponding to the position of Figs. 1 and 3, is illustrated, upon a very much enlarged scale, in Fig. 7; and the final position, corresponding to Fig. 5, in Fig. 6. The projections 18 are shown in Fig. 7 as engaging the very bottoms of the threads 10. In practice, there is usually loose play between the threads 10 and the projections 18. On the other hand, it may be desirable to make the projections 18, or one or more of them, slightly longer, as shown at 36, so as to extend out beyond the threads 8. The longer threads or projections 36 will actually cut a deeper thread into the internally threaded wall of the member 6 during the assembly of the members 6 and 12. The plowing movement produced by thus sliding the key into the internally threaded wall of the nut 6 will then likewise be deeper.

The slot 16 is shown in Figs. 1, 3, 4 and 5 as open at the bottom of the screw or bolt 12 and closed by a limiting wall 24 at its other end. The projection 18 that is disposed immediately next to this wall 24, shown at 26, will strike this wall 24 if too great a blow is imparted to the pin 22, thereby limiting the degree of plowing movement of the projections 18 into the threads 10. As illustrated in Fig. 6, the length of this plowing movement is preferably about half the pitch of the threads. Anything smaller than this will not produce so great a holding action, and anything greater than this would produce the same result on the other side of this position of maximum holding power. It is not to be understood, however, that such maximum degree of holding power is necessary in all cases. In the case of ophthalmic mountings, for example, a very slight plowing action is sufficient for the relatively slight strains ordinarily encountered.

A bore 28 communicates with one end of the slot 16 and extends from the said end through the head of the screw or bolt, as shown; and the key 14 has a stem in this bore and extending beyond the head end of the bore. The free end of the stem is enlarged or headed over at 30 to engage against a wall 32 of a countersunk opening 34 in the head of the screw or bolt 12. The key 14 is thus prevented by the head 30 from falling out of the slot 16 in one direction and by the projection 26 and the wall 24 from falling out of the slot 16 in the opposite direction. The key 14 can not, therefore, become separated from the screw or bolt 12 at times when the key 14 is not plowed into the internal threads 12 of the nut 6.

Instead of driving the key 14 from the lower end of the screw or bolt 12 towards the head end, as illustrated in Fig. 5, it may be desirable to drive the key 14 in the opposite direction. This may be effected by modifying the construction slightly, as illustrated in Fig. 9. The projections 18 are so designed that, when they are alined with the threads, to permit screwing into the nut 6, the head 30 is raised above the countersunk wall 32. The blow required to plow the projections into the threads 10 will now be administered to the head 30. The limiting wall corresponding to the wall 24 will now be constituted of the head 30 engaging against the wall 32 of the countersink, and a separating movement of the key 16 in the opposite direction may be prevented by heading over the other end of the key 14 at 38, so that it may engage against a limiting wall of a countersink 40, as illustrated in Fig. 9.

To release the lock, all that is necessary, in all cases, is to administer a slight blow to the key 14 in the opposite direction. The projections 18 will then be forced out of their plowed-in positions, and in between the threads 10, permitting unscrewing of the screw or bolt 12 from the nut 6. In all cases, the degree of movement of the locking member 14 is so limited by the limiting stops 26, 24 or 30, 32 that plowing movement or movement in the opposite direction is preferably prevented beyond a distance less than the pitch of the threads. The lock may also be released by prying loose the head 30 in Fig. 9 or the other end of the key 14 in the other figures.

Further modifications will occur to persons skilled in the art, and all such are intended to be included within the scope of the appended claims.

What is claimed is:

1. A nut lock comprising a screw-threaded bolt having a slot extending longitudinally of the shank thereof and having a limiting wall, the bolt having a bore communicating with one end of the slot and extending from the said end of the slot through the head of the bolt, the bolt being adapted to be screwed into an internally screw-threaded member, and a key slidably mounted in the slot for preventing relative movement of the bolt and the internally screw-threaded member, the key having threads adapted to be alined with the threads of the bolt to permit screwing the bolt and the key as a unit into the internally screw-threaded member, and the key having a stem in the bore and extending beyond one end of the bore, the extending end of the stem being enlarged to engage against a portion of the bolt to limit relative movement of the bolt and the key in one direction and one of the threads of the key being adapted to engage against the limiting wall of the slot to limit relative movement of the bolt and the key in the opposite direction.

2. A nut lock comprising a screw-threaded member adapted to be threadably mounted upon a second screw-threaded member, one of the screw-threaded members having a slot interrupting its threads and disposed adjacent to the threads of the other member, and a key slidably mounted in the slot and having threads adapted to be alined with the threads of the said other member to permit screwing the slotted member and the key as a unit with respect to the said other member, the key being adapted to be plowed by a sliding movement into the threads of the said other member to prevent relative movement of the members, one or more of the threads of the key extending out beyond the threads of the slotted member to permit their cutting into the said other member during the screwing of the slotted member and the key with respect to said other member.

3. A nut lock comprising a screw-threaded member adapted to be threadably mounted upon a second screw-threaded member, one of the screw-threaded members having a slot interrupting its threads and disposed adjacent to the threads of the other member, the slot having a limiting wall, a key slidably mounted in the slot and having threads adapted to be alined with the threads of the said other member to permit screwing the slotted member and the key as a unit with respect to the said other member, one of the threads of the key being adapted to engage against the limiting wall of the slot to limit relative movement of the bolt and the key in one direction.

NATHAN PEARLSTEIN.